(12) United States Patent
Kim et al.

(10) Patent No.: US 10,822,667 B2
(45) Date of Patent: Nov. 3, 2020

(54) MANUFACTURING METHOD OF BREATHABLE HYBRID-LEATHER

(71) Applicant: ATKO PLANNING INC., Paju-si, Gyeonggi-do (KR)

(72) Inventors: Jieon Kim, Seoul (KR); Bong Jin Choe, Gwangju-si (KR); Kang Gu Lee, Siheung-si (KR); Young Hyeon Choe, Incheon (KR)

(73) Assignee: ATKO PLANNING INC., Paju-si, Gyeonggi-do (KR)

( * ) Notice: Subject to any disclaimer, the term of this patent is extended or adjusted under 35 U.S.C. 154(b) by 175 days.

(21) Appl. No.: 16/009,239

(22) Filed: Jun. 15, 2018

(65) Prior Publication Data

US 2018/0371558 A1    Dec. 27, 2018

(30) Foreign Application Priority Data

Jun. 21, 2017  (KR) .......................... 10-2017-0078407

(51) Int. Cl.
| | | |
|---|---|---|
| *C14B 7/04* | (2006.01) | |
| *B32B 7/12* | (2006.01) | |
| *B32B 5/18* | (2006.01) | |
| *B32B 5/02* | (2006.01) | |
| *B32B 5/24* | (2006.01) | |
| *B32B 37/12* | (2006.01) | |
| *C14B 1/30* | (2006.01) | |

(Continued)

(52) U.S. Cl.
CPC .................. *C14B 7/04* (2013.01); *B32B 5/02* (2013.01); *B32B 5/18* (2013.01); *B32B 5/245* (2013.01); *B32B 7/12* (2013.01); *B32B 9/025* (2013.01); *B32B 37/1207* (2013.01); *C14B 1/30* (2013.01); *C14B 1/50* (2013.01); *B32B 2037/1215* (2013.01); *B32B 2038/0064* (2013.01); *B32B 2266/0278* (2013.01); *B32B 2305/70* (2013.01); *B32B 2479/00* (2013.01); *B32B 2605/003* (2013.01)

(58) Field of Classification Search
CPC ........ B32B 37/1207; B32B 2038/0064; B32B 38/06; B32B 2307/724; B32B 5/02; B32B 2305/70; B32B 2479/00; B32B 9/025; B32B 5/245; B32B 5/18; B32B 2037/1215; B32B 2605/003; B32B 2266/0278; B32B 7/12; C14B 1/30; C14B 7/04; C14B 1/50; C14B 7/02

See application file for complete search history.

(56) References Cited

U.S. PATENT DOCUMENTS

2004/0151852 A1* 8/2004 Gauthier ................. C14C 13/00
                                                  428/35.6

FOREIGN PATENT DOCUMENTS

| KR | 10-0741377 B1 | 7/2007 |
|---|---|---|
| KR | 10-2009-0131419 A | 12/2009 |

(Continued)

*Primary Examiner* — Vishal I Patel
(74) *Attorney, Agent, or Firm* — Revolution IP, PLLC (57) ABSTRACT

A method for manufacturing a breathable hybrid leather includes: a raw material supply step of supplying the natural leather of recycled leather; a step of applying a hot-melt adhesive to the upper surface of the leather raw material; a bonding step of supplying a fabric to the upper surface of the adhesive layer and applying heat and pressure to the leather raw material, the adhesive layer, and the fabric to obtain a bonded fabric; and a step of ironing and coating the bonded fabric a plurality of times.

14 Claims, 5 Drawing Sheets

(51) Int. Cl.
*C14B 1/50* (2006.01)
*B32B 9/02* (2006.01)
*B32B 38/00* (2006.01)

(56) References Cited

FOREIGN PATENT DOCUMENTS

| KR | 10-2010-0050275 | * | 5/2010 |
| KR | 10-1022828 B1 | | 3/2011 |
| KR | 10-2011-0130780 A | | 12/2011 |
| KR | 10-2017-0025341 A | | 3/2017 |

* cited by examiner

FIG. 5

MANUFACTURING METHOD OF BREATHABLE HYBRID-LEATHER

TECHNICAL FIELD

The present invention relates to a method for manufacturing a breathable hybrid leather and a hybrid leather obtained by the same. More particularly, the present invention relates to a leather obtained by bonding a natural leather raw material obtained from leather waste and a fabric and having a soft feeling and improved physical and chemical performances.

BACKGROUND ART

Leather is largely classified into natural leather and artificial leather. Unlike artificial leather, natural leather has pores and thus has an excellent breathability like the human skin. Thus, unlike artificial leather, it does not cause phenomena such as non-absorption of sweat or stickiness and thus is widely used as expensive daily necessities and interior materials for automobiles, etc. Natural leather, which is a tough skin that envelops the body of an animal, is widely used in various fields such as bags, shoes, and furniture due to its excellent properties.

Artificial leather refers to a material prepared by placing a layer of a synthetic resin of an organic compound on a fibrous material such as a nonwoven fabric or a woven fabric so that it resembles natural leather as much as possible. It can compensate for the disadvantages of natural leather, such as price, output and product equalization.

Natural leather is manufactured into a product through chemical and physical processing after being separated from an animal's body. Among various processing steps, it is essential to cut the leather according to the design of a desired product. As a result of this cutting process, a large amount of leather waste is generated, and most of the leather waste is disposed of by incineration and landfill, causing serious environmental problems.

In order to minimize the environmental problems, various studies are being conducted to recycle the leather waste to be incinerated and buried. Korean Patent No. 10-1022828 (Mar. 9, 2011) entitled "Manufacturing Method and Manufacturing System of Dry Artificial Leather Fabric, and Dry Artificial Leather Fabric Manufactured by the Same" discloses a technology of manufacturing an artificial leather by crushing leather waste and using a synthetic resin adhesive.

However, Korean Patent No. 10-1022828 includes a step of curing, heating and rolling a synthetic resin adhesive in the process of manufacturing a recycled leather sheet by crushing leather waste and using the synthetic resin adhesive. This step generates toxic gases, and thus, it still has a limit in that it causes environmental pollution.

Consumers are increasingly in need of natural leather raw materials that have a soft feeling and are free from odor, static electricity, dust, etc. while minimizing environmental pollution. Also, researches on leather processing methods are actively underway to meet the demand.

Car seats, furniture interior products, etc. require their own tailored design leather, and they can be overpriced if natural leather rawhide is applied to all of the parts. In addition, natural leather has limited output, and it cannot be continuously processed because it is in the form of a single sheet. Also, it is difficult to expect color diversification or quality equalization. For example, natural leather is divided into a grain layer and a flesh layer. Among them, only the grain layer is used as a covering material for car seats. When rawhide is sectioned, the uppermost layer is called a grain layer and the part below the layer is called a flesh layer. The grain layer has natural emboss of a leather surface and thus excellent surface characteristics. However, it is expensive and has many disadvantages in industrial utilization due to the limited output.

Therefore, in order to apply natural leather rawhide to car seats or various interior products, etc. in a more reasonable manner, a recycled leather obtained by mixing natural leather, an adhesive and other raw materials is reprocessed into the form of a natural leather. The reprocessed recycled leather is similar to natural leather but cheap and has an environment-friendly advantage because it reduces wasted leather. However, since it is produced by blending polyester, cotton, etc. and then processing the blended materials, it has a slightly poor texture as compared to the original rawhide. Thus, in reality, it is only used in low-priced products rather than high-end products.

As a result, there was a limit in lowering the price of leather, because the grain fabric using the grain layer of natural leather was unable to meet the demand for the fabric used for the interior materials of automobiles due to the increase of the automobile market. Thus, the grain fabric using grain layer leather has been used only for luxury cars. Therefore, there are a persistent sense of deprivation and complaints due to the gap in the interior materials of car seats between the mid-low-end cars and luxury cars.

SUMMARY OF INVENTION

Technical Problem

The present invention has been made to solve the above-mentioned problems, and it is an object of the present invention to provide a method for manufacturing a hybrid leather sheet with enhanced breathability and soft feeling while minimizing environmental pollution and reducing price burden.

Objects of the present invention are not limited to the object described above, and other objects that are not described will be clearly understood by a person skilled in the art from the description below.

Solution to Problem

As a result of intensive efforts to develop a hybrid leather that is economic, equal in quality and has the advantages of natural leather rawhide while minimizing environmental pollution, the present inventor produced a breathable and economic hybrid leather by obtaining leather raw material fibers from leather waste, blending, aligning, sheeting, and bonding them with fabric.

As a technical means for achieving the above-described technical object, one aspect of the present invention provides a method for manufacturing a breathable hybrid leather, which comprises: a raw material supply step of supplying the natural leather of recycled leather; a step of applying a hot-melt adhesive to the upper surface of the leather raw material; a step of supplying a fabric to the upper surface of the adhesive layer and applying heat and pressure to the leather raw material, the adhesive layer, and the fabric to bond them; and a step of ironing and coating the bonded fabric a plurality of times.

In one embodiment of the present invention, the ironing and coating step may comprise: a first ironing and coating step of ironing the bonded fabric obtained at the bonding step and applying a permeable coating material to the upper surface of the fabric of the bonded fabric; and a second ironing and coating step (S620) of, after the first ironing and coating step, ironing the bonded fabric and the permeable coating material and applying soft foam to the upper surface of the permeable coating material.

In one embodiment of the present invention, the first ironing operation of the first ironing and coating step may be performed at a temperature of 100 to 140° C., a pressure of 100 to 140 kg/cm$^2$, and a rate of 7 to 9 m/min.

In one embodiment of the present invention, the first coating operation of the first ironing and coating step may be an operation of applying the permeable coating material at a rate of 4 to 8 g/sf.

In one embodiment of the present invention, the second ironing operation of the second ironing and coating step may be performed at a temperature of 100 to 150° C., a pressure of 30 to 100 kg/cm$^2$, and a rate of 3 to 8 m/min.

In one embodiment of the present invention, the second coating operation of the second ironing and coating step may be an operation of applying soft foam at a rate of 10 to 14 g/sf.

In one embodiment of the present invention, the method may further comprise a third ironing step of ironing the bonded fabric coated with soft foam while embossing a second coating layer to form a pattern.

In one embodiment of the present invention, the ironing and embossing operation of the third ironing step may be performed at a temperature of 120 to 150° C., a pressure of 40 to 180 kg/cm$^2$, and a rate of 3 to 8 m/min.

In one embodiment of the present invention, the method may further comprise, after the third ironing step, a painting step of spraying a resin solution in which a pigment is diluted onto the surface of the second coating layer to impart a color; and a step of spraying a top protective resin onto the painted surface to protect the painted surface.

In one embodiment of the present invention, the resin solution in which a pigment is diluted may consist of 13 to 19 parts by weight of a filler, 7 to 13 parts by weight of an acrylic resin, and 62 to 72 parts by weight of a polyurethane.

In one embodiment of the present invention, the resin solution in which a pigment is diluted may be applied at a rate of 1 to 3 g/sf.

In one embodiment of the present invention, the top protective resin may be applied at a rate of 1 to 3 g/sf.

In one embodiment of the invention, the raw material supply step may comprise: a step of obtaining leather fibers from leather waste; blending the obtained leather fibers with fibers for improving the tensile strength and aligning the blended fibers; and combining the blended leather fibers with a bottom cloth fabric and forming a sheet by means of physical striking or pressing without an adhesive.

In one embodiment of the present invention, the method may further comprise, prior to the step of obtaining leather fibers, a step of pretreating leather waste.

In order to achieve the above technical object, another aspect of the present invention provides a hybrid leather comprising: a surface protective layer; a paint layer; first and second coating layers; and a bonded fabric, wherein the bonded fabric comprises a fabric layer; a fibrous layer comprising leather fibers and fibers blended with the leather fibers; and a bottom cloth fabric layer located on the underside of the fibrous layer.

In one embodiment of the present invention, the bottom cloth fabric layer may be combined with the fibrous layer by physical striking or pressing without an adhesive.

Advantageous Effects of Invention

According to one embodiment of the present invention, it is possible to provide a hybrid leather for automobile interior materials which satisfies the physical and chemical performances required in the automobile industry while ensuring breathability, by bonding a raw material recycled from natural leather with fabric, etc. Also, according to one embodiment of the present invention, it is possible to achieve properties such as tearing strength, tensile strength and elongation while achieving price competitiveness by reducing the cost compared to grain layer leather. It is possible to provide a hybrid leather having breathability while retaining the advantages of natural leather by coating an aqueous coating material onto a fabric.

It is to be understood that the effects of the present invention are not limited to the above-described effects, but include all effects that can be deduced from the detailed description of the present invention or the constitution of the invention described in the claims.

DESCRIPTION OF EMBODIMENTS

Embodiments

Hereinafter, the present invention will be described with reference to the accompanying drawings. The present invention may, however, be embodied in many different forms. Thus, the scope of the present invention is not limited to the embodiments set forth herein but defined by the appended claims. In order to clearly illustrate the present invention, parts not related to the description are omitted, and like parts are denoted by like reference numerals throughout the specification.

Herein, when a part is described as being "connected" or "coupled" to another part, it may be directly connected or coupled to another part or may be indirectly connected or coupled to another part with a member interposed therebetween. Further, the terms "comprise" and "include" as used herein refer to the presence of the corresponding component and is not intended to exclude additional components, unless otherwise specified.

The terms as used herein are for the purpose of describing particular embodiments only and are not intended to limit the invention. As used herein, the singular forms "a," "an" and "the" are intended to include the plural forms as well, unless the context clearly indicates otherwise. It is to be further understood that the terms "comprise," "include" and "have" as used herein specify the presence of stated features, numbers, steps, actions, components, parts, or a combination thereof, but do not preclude the presence or addition of one or more other features, numbers, steps, actions, components, parts, or a combination thereof.

Hereinafter, embodiments of the present invention will be described in detail with reference to the accompanying drawings.

The method for manufacturing a breathable hybrid leather according to one aspect of the present invention comprises: a raw material supply step of supplying the natural leather of recycled leather; a step of applying a hot-melt adhesive to the upper surface of the leather raw material; a step of supplying a fabric to the upper surface of the adhesive layer and applying heat and pressure to the leather raw material, the adhesive layer, and the fabric to bond them; and a step of ironing and coating the bonded fabric a plurality of times.

The leather waste is an animal skin classified as waste. It may be at least one selected from the group consisting of cow leather, pig leather, sheep leather, horse leather and ostrich leather, although not limited thereto.

Figure 1:
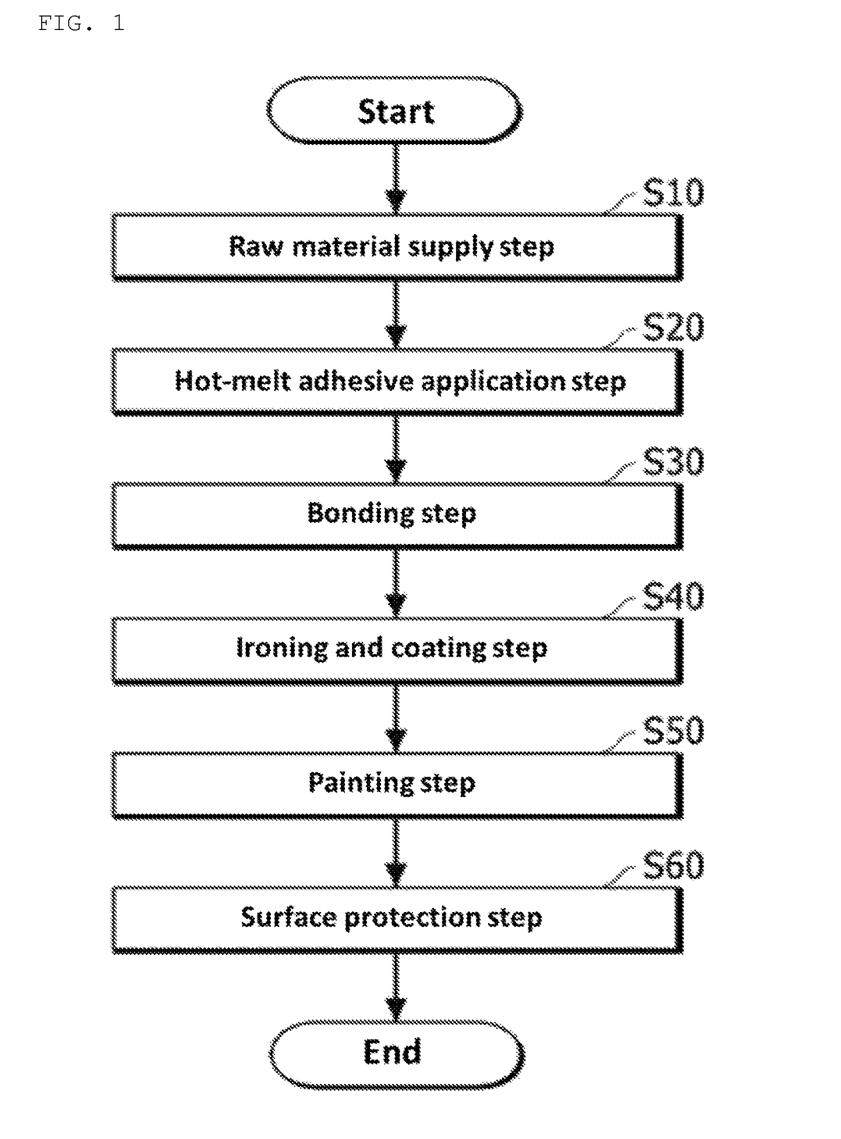
FIG. 1 is a diagram showing the entire steps of a method for manufacturing a hybrid leather according to one embodiment of the present invention.

Once a leather raw material is supplied through the raw material supply step of supplying the natural leather of recycled leather, a step (S20) of applying a hot-melt adhesive to the upper surface of the leather raw material sheeted according to one embodiment of the present invention is performed. The hot-melt adhesive uses a non-volatile, non-flammable, thermoplastic resin that is 100% solid at room temperature and does not use water or a solvent at all. It is a heat-melt adhesive that is applied to an adherend in a liquid form at a high temperature, pressed and then cooled and solidified in a few seconds to achieve adhesion. The type of the hot-melt adhesive with the characteristics is not particularly limited as long as it is fused depending on the type and nature of the material to be bonded to facilitate bonding between the material and a component. However, it may preferably be at least one selected from the group consisting of ethylene vinyl acetates (EVA), polyamides (PA), polyesters, rubbers, polyether sulfones (PES), thermoplastic polyurethanes (TPU) and polyurethanes (PU). The hot-melt adhesive has a faster bonding speed than solvent-type and water-soluble adhesives, has a wide range of applications due to its wide range of adhesion, and is harmless to the human body and environmentally friendly because it does not use a solvent. In addition, the hot-melt adhesive forms a strong adhesive layer with a small amount and thus is economical in terms of labor cost and productivity. It also has water resistance and glossiness.

After an adhesive layer is formed on the upper surface of the sheeted leather raw material by application of the hot-melt adhesive, a step (S30) of supplying a fabric to the upper surface of the adhesive layer and applying heat and pressure to bond them is performed. The type of the fabric is not particularly limited as long as it is a fabric that increases breathability. However, it may preferably be tricot or double raschel manufactured by a known technology. The bonding step (S30) is a step of applying a predetermined heat and pressure to the leather raw material, the adhesive layer, and the fabric so that the leather raw material and the fabric are strongly attached to each other.

The method may further comprise, after completion of the bonding step (S30), an ironing and coating step (S40) of ironing and coating the bonded fabric a plurality of times at a predetermined temperature, pressure, and rate.

Figure 2:
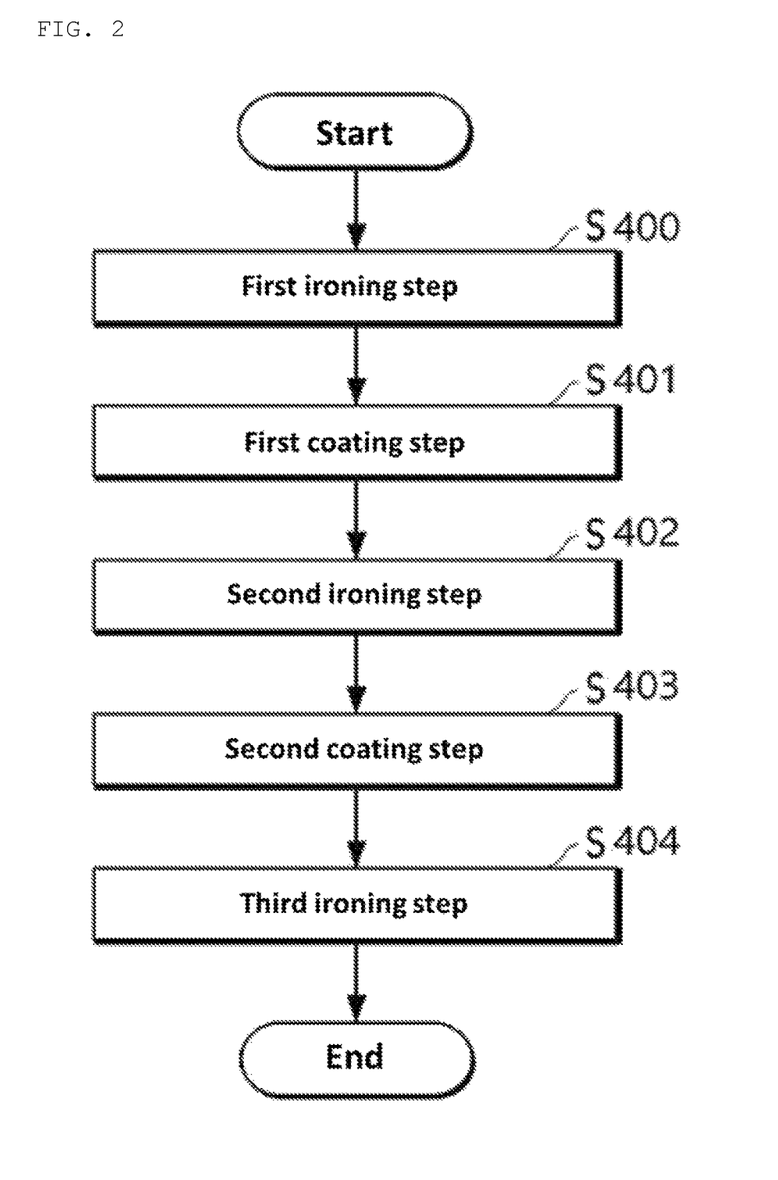
FIG. 2 is a diagram of the detailed steps of an ironing and coating step (S40).
Figure 3:
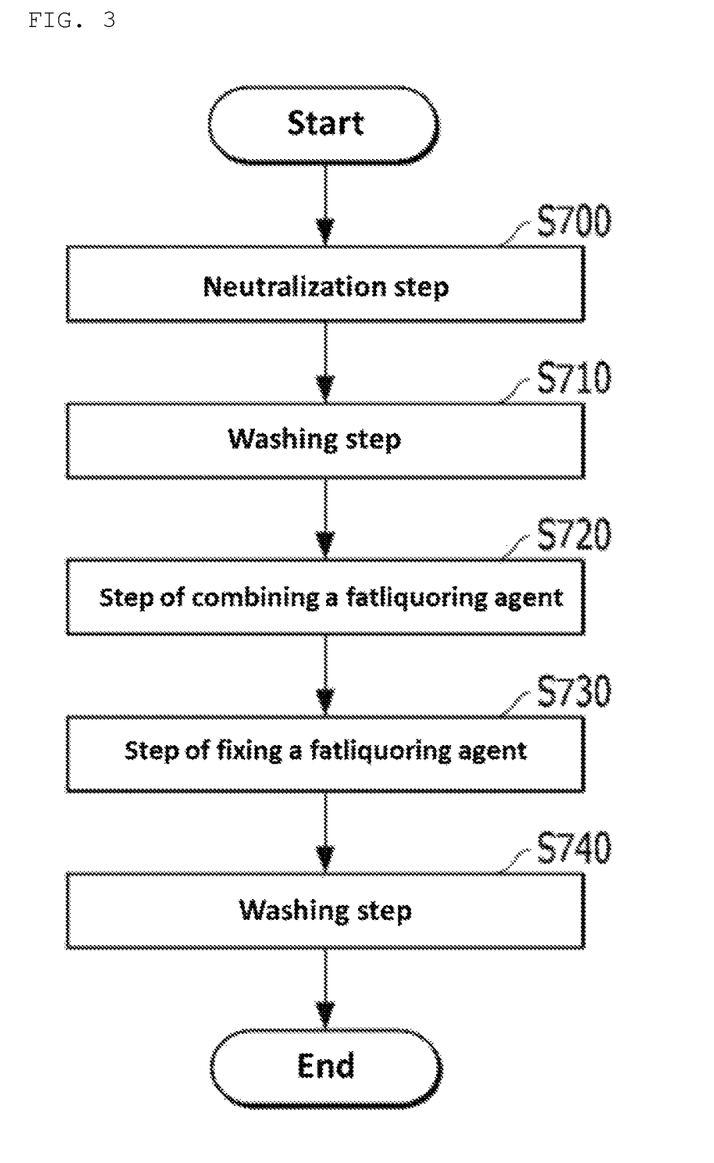
FIG. 3 is a diagram of the detailed steps of a step (S70) of pretreating leather waste.
Figure 4:
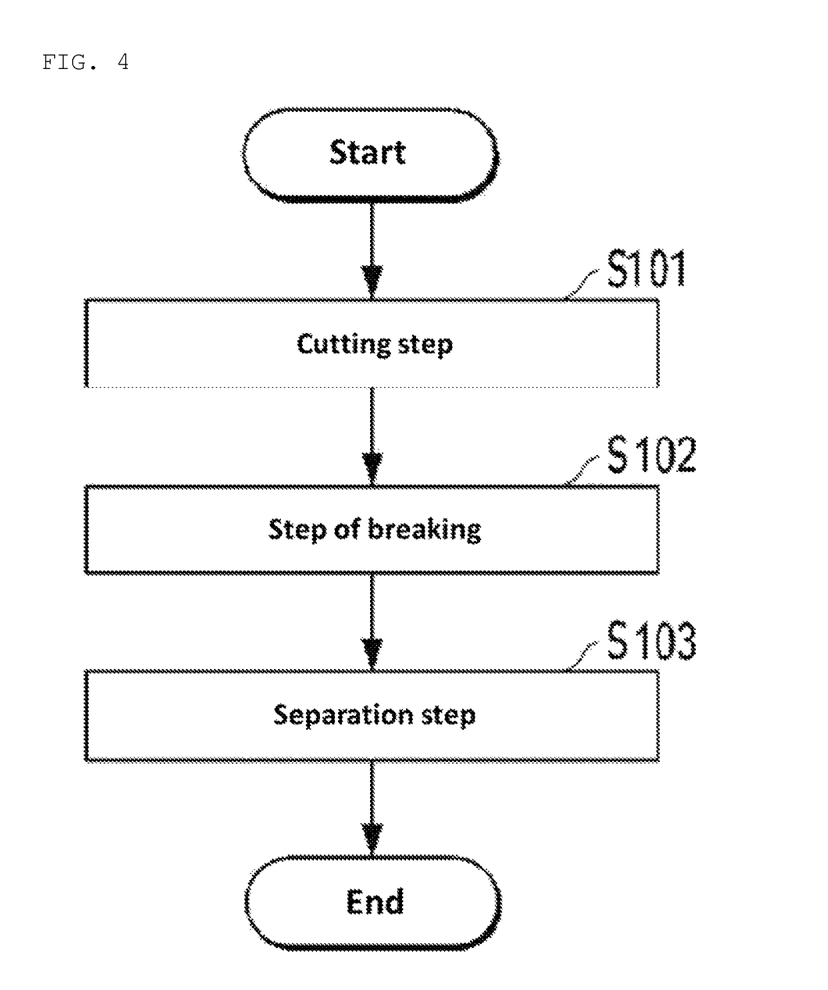
FIG. 4 is a diagram of the detailed steps of a step (S100) of obtaining leather fibers.

The ironing and coating step (S40) may comprise: a first ironing and coating step (S400, S401) of ironing the bonded fabric obtained at the bonding step and applying a permeable coating material to the upper surface of the fabric of the bonded fabric; and a second ironing and coating step (S402, S403) of, after the first ironing and coating step, ironing the bonded fabric and the permeable coating material and applying soft foam to the upper surface of the permeable coating material.

In the first ironing and coating step, the first ironing operation may be performed at a temperature of 100 to 140° C., a pressure of 100 to 140 kg/cm$^2$, and a rate of 7 to 9 m/min. The ironing operation is to resolve differences between sites and ensure the uniformity of the thickness by ironing the bonded fabric.

In the first ironing and coating step, the first coating operation is performed by applying a permeable coating material to the upper surface of the fabric of the bonded fabric after the first step (S400). Here, the permeable coating material may consist of 75 to 95 parts by weight of a filler, 7 to 13 parts by weight of a permeable acrylic resin binder, and 3 to 7 parts by weight of a micro-urethane binder. It may preferably be applied at a rate of 4 to 8 g/sf.

The permeable acrylic resin binder allows the filler to be attached to a fabric. The acrylic resin binder permeates into the fabric and the binder of urethane-based microparticles is mixed and post-treated to prevent falling off during use and washing.

The permeable coating material is coated by a roller rotating in a stucco reverse roll coating manner, in which the roller rotates in a direction reverse to the advancing direction of the bonded fabric, and the first coating material applied to the rotating coating roller presses the upper surface of the fabric to perform coating.

In the second ironing and coating step, the second ironing operation is to resolve differences between sites and ensure the uniformity of the thickness by ironing the bonded fabric coated with the permeable coating material, after the first coating step (S410). Preferably, it may be performed at a temperature of 100 to 150° C., a pressure of 30 to 100 kg/cm$^2$, and a rate of 3 to 8 m/min.

The second coating operation of the second ironing and coating step is a step of, after the second ironing step (S402), applying soft foam to the upper surface of the permeable coating material as a first coating layer. The soft foam may consist of 14 to 20 parts by weight of a filler, 7 to 13 parts by weight of an acrylic resin, and 60 to 80 parts by weight of a polyurethane. It may preferably be applied at a rate of 10 to 14 g/sf.

The filler of the ironing and coating step is not particularly limited. However, it may preferably be made of a breathable polyurethane foam. The polyurethane refers to a polymer compound made of a urethane bond formed by a combination of an alcohol group and an isocyanic group and is widely used in artificial leather because of its excellent thermosetting property, thermoplasticity, rubber elasticity, abrasion resistance, aging resistance and oil resistance.

The acrylic resin of the filler is a liquid based on acrylonitrile (AN) and used for acrylic fibers. The polyurethane of the filler may be one of a foamed polyurethane or a non-foamed polyurethane.

The method may further comprise, after the first and second ironing and coating steps, a third ironing step (S404). The third ironing operation of the third ironing step is an operation of ironing the bonded fabric coated with soft foam while embossing the soft foam as a second coating layer to form a pattern.

The third ironing step (S404) is a step of, after the second coating step (S403), ironing the second coating layer obtained by application of soft foam while embossing the second coating layer to form a pattern. It may be performed by ironing at a temperature of 120 to 150° C., a pressure of 40 to 180 kg/cm$^2$, and a rate of 3 to 8 m/min using a rolling roller while embossing the second coating layer simultaneously.

The method may further comprise, after the third ironing step, a painting step (S50) and a step (S60) of protecting a painted surface. The painting step (S50) is a step of, after the third ironing step (S404), spraying a resin solution in which a pigment is diluted onto the surface of the second coating layer to impart a color. The resin solution in which a pigment is diluted may preferably consist of 13 to 19 parts by weight of a filler, 7 to 13 parts by weight of an acrylic resin, and 62 to 72 parts by weight of a polyurethane, and may be applied at a rate of 1 to 3 g/sf.

The resin solution in which a pigment is diluted is an aqueous liquid in which a filler, an acrylic resin, and a polyurethane are mixed. It may be preferable to apply the resin solution in which pigments of various colors are diluted to the second coating layer to uniformly color the layer. The resin solution may be further applied a plurality of times to obtain a color, if necessary, after a color is imparted by first application.

The step (S60) of protecting a painted surface is a step of, after the painting step (S50), spraying a top protective resin. The top protective resin may consist of 8 to 10 parts by weight of a matte polyurethane, 40 to 60 parts by weight of a polyurethane, 5 to 9 parts by weight of a water-soluble silicone, 8 to 12 parts by weight of an acrylic resin, 5 to 9 parts by weight of a cross-linker, and 2 to 4 parts by weight of a UV blocking agent. The top protective resin may preferably be applied to a painted surface at a rate of 1 to 3 g/sf.

The matte polyurethane is an aqueous polyurethane product in which the solvent of the polyurethane is water and has a matte finish. The matte polyurethane is capable of forming a transparent paint film. It can be repainted at an interval of about 2 hours and does not change the color of leather. The matte polyurethane has a solid content of 30 to 35%. Given that the solid content forms a protective paint layer, it may be preferable to make a paint film by repainting several times, preferably four times or more.

The polyurethane refers to a protective paint obtained by the reaction of an isocyanate group and a hydroxyl group to form a —NHCOO— (urethane bond) in a paint film.

The water-soluble silicone is a silicon resin synthesized from silicon as a raw material. It has heat resistance and thus rarely changes with varying temperature. Also, it has oxidation resistance, resistance to various chemicals, water repellency or water resistance, an electrical insulation property, etc.

The cross-linker is a special resin used as a cross-linking agent in paints, etc. having a surface protective function. The type of the cross-linker is not particularly limited as long as it can be used as a cross-linking agent. However, it may preferably be at least one of a methylated melamine resin, a butylated melamine resin, and a urea melamine resin.

The type of the UV blocking agent is not particularly limited as long as it has a function of blocking light in order to prevent the paint from absorbing light energy such as ultraviolet rays to be decomposed or discolored. However, it may preferably comprise a polycarbonate resin.

The step (S60) of protecting a painted surface can increase the surface properties of the hybrid leather manufactured through the manufacturing steps, prevent scratching, maintain the texture of the natural leather, maintain the color, enhance the waterproofness, breathability, feeling, elasticity and durability.

Figure 5:
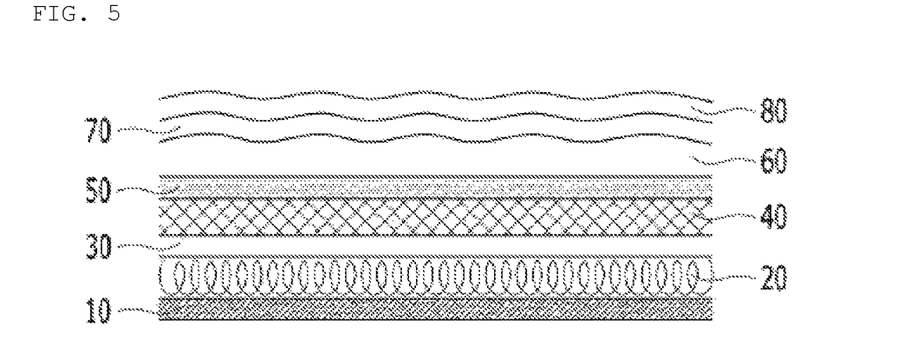
FIG. 5 is a cross-sectional diagram of a hybrid leather structure manufactured according to another embodiment of the present invention.

The hybrid leather manufactured according to another aspect of the present invention may be manufactured according to the above-described manufacturing steps. The hybrid leather comprises, from the top to the bottom, a surface protective layer 80, a paint layer 70, first and second coating layers 50 and 60 and a bonded fabric.

Here, the bonded fabric may consist of a fabric layer 40, an adhesive layer 30, and a leather fabric layer. The leather fabric layer comprises a fibrous layer 20 comprising leather fibers and fibers blended with the leather fibers, and a bottom cloth fabric layer 10 located on the underside of the fibrous layer.

The bottom cloth fabric layer 10 may be combined with the fibrous layer by physical striking or pressing without an adhesive. It may preferably be formed by stacking the aligned fibrous layer 20 and the bottom cloth fabric layer 10 at a height of 10 to 20 cm crossing each other, and then attaching them by physically striking them 900 to 3000 times with a needle punch.

The leather raw material in which the fibrous layer 20 and the bottom cloth fabric layer 10 are bonded may preferably have a thickness of 1.0 to 1.8 mm. When the thickness is less than 1.0 mm, the sheet used as a raw material in the processing of a hybrid leather becomes too thin, resulting in reduced durability. When the thickness exceeds 1.8 mm, the overall hybrid leather may become too thick, which may cause difficulty in processing.

It will be understood by a person skilled in the art that the embodiments of the invention described herein are for illustrative purposes only, and that various changes may be made therein without departing from the spirit and scope of the present invention. The scope of the present invention is defined by the appended claims, and all changes or modifications derived from the meaning and scope of the claims and their equivalents should be construed as being included within the scope of the present invention.

EXAMPLES

Hereinafter, examples and test examples of the present invention will be described in detail so that a person skilled in the art can easily carry out the present invention. The present invention may, however, be embodied in many different forms and should not be construed as limited to the examples and test examples set forth herein.

Example 1: Step of Pretreating Leather Waste 1000 g of leather waste, 950 g of distilled water at 40° C., and 30 g of sodium formate were placed in a drum and mixed for 30 minutes to perform a first neutralization operation. Then, 30 g of sodium bicarbonate was added and mixed for 115 minutes to perform a second neutralization operation.

Then, the neutralized leather waste was mixed with cold water until impurities were removed to perform a washing operation.

Then, the leather waste that has been washed, 1,000 g of water at 55° C., 10 g of aqueous ammonia, and 170 g of a fatliquoring agent were placed in a drum and mixed for 60 minutes to combine the fatliquoring agent.

Then, 20 g of formic acid was added and mixed for 20 minutes to fix the fatliquoring agent.

The leather waste fixed to the fatliquoring agent was mixed with cold water for 25 minutes to perform a washing operation.

Then, the washed leather waste was cut into a length of 7 cm by a leather grinder, and dismantled to obtain non-uniform short staple fibers.

Example 2: Step of Manufacturing a Leather Sheet Raw Material

The leather fibers obtained in Example 1 were blended with 150 g of PET, PP, PE or filament yarns, and then the blended leather fibers were aligned using a carding machine. Then, the aligned leather fibers and bottom cloth fabric were stacked at a height of 15 to 20 cm crossing each other. Then, the bottom cloth fabric and the blended leather fibers were stricken 900 to 3000 times with a needle punch to physically combine them and obtain a sheet.

Example 3: Step of Bonding a Leather Raw Material and a Fabric to Manufacture a Hybrid Leather A hot-melt adhesive was applied to the upper surface of the leather raw material prepared in Example 2, and then a known water-repellent tricot fabric or double raschel fabric was stacked on the adhesive layer.

A predetermined heat and pressure were applied to the stacked leather raw material, the adhesive layer and the fabric in the upward and downward directions to obtain a bonded fabric in which the leather raw material and the fabric are rigidly attached to each other.

The bonded fabric was interposed between and passed through circular rollers facing each other at a temperature of 120° C., a pressure of 120 kg/cm$^2$, and a feed rate of 8 m/min to perform a first ironing operation. The bonded fabric achieved a uniform thickness through the first ironing operation.

After the first ironing operation, a permeable coating material was applied to the upper surface of the fabric to form a first coating layer. The permeable coating material was prepared with 85 parts by weight of a filler, 10 parts by weight of a permeable acrylic resin binder, 5 parts by weight of a micro-urethane binder, and applied at a rate of 6 g/sf.

The bonded fabric coated with the first coating layer was passed through circular rollers facing each other at a temperature of 125° C., a pressure of 65 kg/cm$^2$, and a feed rate of 5.5 m/min to perform a second ironing operation.

After the second ironing operation, soft foam was applied to the upper surface of the permeable coating material to form a second coating layer. The soft foam of the second coating layer was prepared with 17 parts by weight of a filler, 10 parts by weight of an acrylic resin, and 70 parts by weight of a polyurethane, and applied at a rate of 12 g/sf.

After the second coating step, the bonded fabric coated with soft foam was subjected to a third ironing operation using rolling rollers facing each other at a temperature of 125° C., a pressure of 110 kg/cm$^2$, and a feed rate of 5.5 m/min. At the same time, an embossing operation was performed on the second coating layer.

After the third ironing step, a painting operation was performed by applying a resin solution in which a pigment is diluted to the surface of the second coating layer, and a top protective resin was sprayed on the surface of the paint layer to form a surface protective layer.

The resin solution in which a pigment is diluted of the paint layer was prepared with 16 parts by weight of a filler, 10 parts by weight of an acrylic resin, and 67 parts by weight of a polyurethane, and applied at a rate of 2 g/sf. Also, the top protective resin of the surface protective layer was prepared by mixing 9 parts by weight of a matte polyurethane, 50 parts by weight of a polyurethane, 7 parts by weight of an aqueous silicone, 10 parts by weight of an acrylic resin, 7 parts by weight of a cross-linker, and 3 parts by weight of a UV blocking agent, and applied at a rate of 2 g/sf.

REFERENCE SIGNS LIST

10: Bottom cloth fabric layer
20: Fibrous layer
30: Adhesive layer
40: Fabric layer
50: First coating layer
60: Second coating layer
70: Paint layer
80: Surface protective layer
S10: Raw material supply step
S20: Hot-melt adhesive application step
S30: Bonding step
S40: Ironing and coating step
S50: Painting step
S60: Surface protection step
S70: Pretreatment step
S100: Step of obtaining leather fibers
S110: Blending and aligning step
S120: Sheeting step
S400: First ironing step
S401: First coating step
S402: Second ironing step
S403: Second coating step
S404: Third ironing step
S700: Neutralization step
S710: Washing step
S720: Step of combining a fatliquoring agent
S730: Step of fixing a fatliquoring agent
S740: Washing step
S101: Cutting step
S102: Step of breaking bonds
S103: Acquisition (separation) step

The invention claimed is:

1. A method for manufacturing a breathable hybrid leather comprising:
   a leather raw material supply step of supplying a natural leather of recycled leather;
   a step of applying a hot-melt adhesive to an upper surface of the leather raw material to form an adhesive layer;
   a bonding step of supplying a fabric to an upper surface of the adhesive layer and applying heat and pressure to the leather raw material, the adhesive layer, and the fabric to obtain a bonded fabric; and
   a step of ironing and coating the bonded fabric a plurality of times.

2. The method for manufacturing the breathable hybrid leather according to claim 1, wherein the ironing and coating step comprises:
   a first ironing and coating step of ironing the bonded fabric obtained at the bonding step and applying a permeable coating material to an upper surface of the bonded fabric; and
   a second ironing and coating step of, after the first ironing and coating step, ironing the bonded fabric and the permeable coating material and applying soft foam to an upper surface of the permeable coating material to form a second coating layer.

3. The method for manufacturing the breathable hybrid leather according to claim 2, wherein the first ironing operation of the first ironing and coating step is performed at a temperature of 100 to 140° C., a pressure of 100 to 140 kg/cm$^2$, and a rate of 7 to 9 m/min.

4. The method for manufacturing the breathable hybrid leather according to claim 2, wherein the first coating operation of the first ironing and coating step is performed by applying the permeable coating material at a rate of 4 to 8 g/sf.

5. The method for manufacturing the breathable hybrid leather according to claim 2, wherein the second ironing operation of the second ironing and coating step is performed at a temperature of 100 to 150° C., a pressure of 30 to 100 kg/cm², and a rate of 3 to 8 m/min.

6. The method for manufacturing the breathable hybrid leather according to claim 2, wherein the second coating operation of the second ironing and coating step is performed by applying the soft foam at a rate of 10 to 14 g/sf.

7. The method for manufacturing the breathable hybrid leather according to claim 2, wherein the method further comprises a third ironing step of ironing the bonded fabric coated with the soft foam while embossing the second coating layer to form a pattern.

8. The method for manufacturing the breathable hybrid leather according to claim 7,
wherein the ironing and embossing operation of the third ironing step is performed at a temperature of 120 to 150° C., a pressure of 40 to 180 kg/cm², and a rate of 3 to 8 m/min.

9. The method for manufacturing the breathable hybrid leather according to claim 7,
wherein the method further comprises, after the third ironing step,
a painting step of spraying a resin solution comprising a diluted pigment onto a surface of the second coating layer to impart a color; and
a step of spraying a top protective resin onto the surface of the second coating layer to protect the surface of the second coating layer.

10. The method for manufacturing the breathable hybrid leather according to claim 9,
wherein the resin solution comprising the diluted pigment consists of 13 to 19 parts by weight of a filler, 7 to 13 parts by weight of an acrylic resin, and 62 to 72 parts by weight of a polyurethane.

11. The method for manufacturing the breathable hybrid leather according to claim 9,
wherein the resin solution comprising the diluted pigment is applied at a rate of 1 to 3 g/sf.

12. The method for manufacturing the breathable hybrid leather according to claim 9,
wherein the top protective resin is applied at a rate of 1 to 3 g/sf.

13. The method for manufacturing the breathable hybrid leather according to claim 1, wherein the leather raw material supply step comprises:
a step of obtaining leather fibers from leather waste;
a step of blending the leather fibers with fibers to obtain blended leather fibers having improved tensile strength and aligning the blended leather fibers; and
a step of combining the blended leather fibers with a bottom cloth fabric and forming a sheet by means of physical striking or pressing without an adhesive.

14. The method for manufacturing the breathable hybrid leather according to claim 13,
wherein the method further comprises, prior to the step of obtaining leather fibers, a step of pretreating the leather waste.

* * * * *